(12) United States Patent
Single

(10) Patent No.: US 6,862,840 B1
(45) Date of Patent: *Mar. 8, 2005

(54) CONTAINER

(75) Inventor: Jamie Single, Midlothian (GB)

(73) Assignee: Suzanne Wallace Single, Pathhead Midlothian (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/633,366

(22) Filed: Aug. 1, 2003

(51) Int. Cl.[7] .................................................. A01G 9/02
(52) U.S. Cl. .......................................... 47/32.7; 47/65.7
(58) Field of Search ................................ 47/32.7, 32.8, 47/65.7, 66.1, 66.3, 66.4, 73, 77

(56) References Cited

U.S. PATENT DOCUMENTS

| | | | |
|---|---|---|---|
| 3,291,437 A | 12/1966 | Bowden et al. | 249/48 |
| 3,951,294 A | 4/1976 | Wilson | 220/5 |
| 4,442,628 A | 4/1984 | Whitcomb | 47/66 |
| 4,497,132 A | 2/1985 | Whitcomb | 47/66 |
| 4,510,712 A | 4/1985 | Whitcomb | 47/66 |
| 4,716,680 A | 1/1988 | Whitcomb et al. | 47/73 |
| 4,939,865 A * | 7/1990 | Whitcomb et al. | 47/77 |
| 5,099,607 A * | 3/1992 | Lawton | 47/73 |
| 6,612,072 B2 * | 9/2003 | Busby et al. | 47/65.8 |

FOREIGN PATENT DOCUMENTS

| | | | | |
|---|---|---|---|---|
| GB | 2 045 044 | | 2/1983 | |
| GB | 2350272 A | * | 11/2000 | A01G/9/02 |
| JP | 406038640 A | * | 2/1994 | A01G/23/04 |
| WO | WO 99/15000 | * | 4/1999 | A01G/9/02 |

* cited by examiner

Primary Examiner—Son T. Nguyen
(74) Attorney, Agent, or Firm—Testa, Hurwitz & Thibeault, LLP

(57) ABSTRACT

A plant container including at least one section of flexible material having an inner and an outer surface. The inner surface is formed at least in part by a lattice of recesses, and at least some of the recesses converge toward a hole through the material. The outer surface is formed at least in part by a lattice of protuberances at the same relative positional arrangement as the recesses. Each section is formed as a parallelogram having two acute angles and two obtuse angles. Each section is arranged to form a cylinder with adjacent ends overlapping and the protuberances on the outer surface of one end nesting within the recesses of the inner surface of the adjacent end at the overlap.

30 Claims, 4 Drawing Sheets

CONTAINER

FIELD OF THE INVENTION

The present invention relates to containers for transporting plants and in particular, but not exclusively, the invention relates to an easily assembled container with a join adapted to allow access to inspect the root ball of a plant within the container.

BACKGROUND OF THE INVENTION

It is well known in the art to provide plant containers in which the side walls and base have holes or apertures which permit air to circulate around the container. This feature facilitates air pruning of the roots as the root structure expands by virtue of the plant growing in the container.

Such a plant growth container and air pruning feature is that disclosed in U.S. Pat. No. 5,099,607 to Lawton Pa. This patent discloses a container in which plants are to be grown and comprises of a flexible rectangular section of material moulded into a lattice of recesses and corresponding protuberances. The section is formed into a cylinder with the vertical edges of the section overlapping so that opposite recesses and protuberances form a nesting arrangement which is then fastened together to produce the container. Roots are guided into the recesses which converge to holes providing the air interface for air pruning to take place. This plant growth container has the advantages of being easily adaptable in diameter and is reusable.

A similar plant growth container is also disclosed in U.S. Pat. No. 4,939,865 to Whitcomb et al. This patent describes a container comprising a set of upwardly extending removably joined side panels having a lattice of protuberances and corresponding recesses converging to holes. The panels are generally rectangular, bendable and have vertical edge joints so that one or more of the side panels can be joined together to form a generally cylindrical open-topped container. Like the container of U.S. Pat. No. 5,099,607 this container has the advantages of being easily adaptable in diameter and is reusable.

These open topped containers have a number of common disadvantages. As the joints of these containers are on the vertical, it is difficult for a user to peel back a section of the section or panel to inspect the root ball of a plant within.

A further disadvantage is in the strength of the container. These containers are generally constructed of a lightweight material which has the flexibility to bend into the cylindrical form easily. As such, this compromises the weight of the contents i.e. soil and trees or plants, which can safely be transported. Further, when used with a base, the base has a tendency to collapse inwards under the weight of the plant which is placed in the container. The problem is exacerbated for large diameter containers due to the relatively small surface area of support given to the base and the fact that the base rests on a downwardly slopping surface within the container. Thus a great number of bases must be manufactured to provide for each possible diameter size due to the fact that the diameter of the base must be a close match to the diameter of the container.

A yet further disadvantage of this open topped container is that current formers used to make the sections are flat topped formers. These produce a flat surface that deflects the roots back as opposed to guiding them gently towards the air interface.

SUMMARY OF THE INVENTION

It is an object of the present invention to provide a container for an improved plant root container which can be manufactured in simple pieces and assembled easily.

It is a further object of the present invention to provide an improved plant root container which obviates or mitigates at least some of the disadvantages of prior art plant root containers.

It is a further object of the present invention to provide an improved plant root container which provides a join adapted to allow access to inspect the root ball of a plant within the container.

According to a first aspect of the present invention, there is provided a plant container, the container comprising at least one section of flexible material, the material having an inner and an outer surface, said inner surface being formed at least in part by a lattice of recesses, at least some of said recesses converging towards a hole through the material, said outer surface being formed at least in part by a lattice of protuberances at the same relative positional arrangement as the recesses, wherein said section is formed as a parallelogram having two acute angles and two obtuse angles, the one or more sections being arranged to form a cylinder with adjacent ends overlapping and the protuberances on the outer surface of one end nesting within the recesses of the inner surface of the adjacent end at the overlap.

This arrangement provides a diagonal join, extending partly around the cylinder. An upper portion of an end i.e. that part including an acute angle of the parallelogram, can be 'peeled back'. This allows inspection of the contents of the container or allows the contents to be removed, without the container collapsing, as the ends towards a base of the container remain in the overlapped configuration.

Preferably the acute angles are in the range 30 to 60 degrees. Advantageously, the acute angles are at 45 degrees.

Preferably the container includes one or more fastening means provided to hold the section in said overlapping, nested engagement. Preferably there are at least two fastening means arranged on the overlap. This allows a top fastening means to be released to 'peel back' the material for inspection, while still securing the bottom of the cylinder around the contents. Preferably the fastening means is by screws located through the holes formed in the recesses. Alternatively, fastening means may be a clip or other arrangement attached to the overlapping portion of the section.

Preferably the section has a length greater than its width. Preferably at least some of said recesses are of a substantially truncated conical form. Optionally, each recess comprises a wall which converges towards the hole, adjacent walls forming a peak between each recess, wherein a plurality of said peaks are located on a row lengthways on the inner surface having a height greater than that of adjacent peaks across the width of the inner surface. This arrangement provides a ledge or support within the container.

Preferably the container further comprises a base. Advantageously the base is arranged to rest on said walls of said peaks of greater height.

Preferably, each base of the recesses and each apex of the protuberances forms a point. This ensures that flat surfaces inside the container are kept to a minimum which reduces the number of roots deflected back into the root ball and ensures the roots are guided gently towards the holes where they contact the air interface and are pruned.

Preferably the holes within the recesses are of various diameters over the width of the section.

Advantageously, at a position in the container where no growing medium a adjacent the inside wall, typically at the top of the container, one or more rows of recesses have no holes. By not incorporating holes at the top of the container, this allows for the container to hold water when the plant is watered.

At positions where the growing medium is adjacent inner surface, the recesses may have medium sized holes. Medium sized holes are defined as apertures which remove 6%–20% of the area at the base of a recess. The percentage being dependent on the species of plant being housed in the container.

Advantageously, recesses below the base may have large holes. Large sized holes are defined as apertures which remove 20%–40% of the area at the base of a recess. The holes below the base increase the amount of air circulation to aid air root pruning.

Advantageously also, protuberances may also have holes at their apex. This 'double holing' further increases air circulation and is preferably located under the base.

Preferably the material is formed from a relatively thin sheet of plastic material and the said recesses in said inner surface produces said protuberances in said outer surface.

Preferably the container is made of a plastic. More preferably the plastic is chosen to be easily moulded on a former. The plastic may be a recycled plastic such as HDPE obtained from domestic waste. Advantageously a pigment may be added to the plastic to colour the plastic. Preferably the plastic is dyed black.

According to a second aspect of the present invention, there is provided a section of material for forming a container, the material having an inner and an outer surface, said inner surface being formed at least in part by a lattice of recesses, at least some of said recesses converging towards a hole through the material, said outer surface being formed at least in part by a lattice of protuberances at the same relative positional arrangement as the recesses, wherein said section is formed as a parallelogram having two acute angles and two obtuse angles.

Preferably the acute angles are in the range 30 to 60 degrees. Advantageously, the acute angles are at 45 degrees.

Preferably the section has a length greater than its width. Preferably at least some of said recesses are of a substantially truncated conical form. Optionally, each recess comprises a wall which converges towards the hole, adjacent walls forming a peak between each recess, wherein a plurality of said peaks are located on a row lengthways on the inner surface having a height greater than that of adjacent peaks across the width of the inner surface.

Preferably the holes within the recesses are of various diameters over the width of the section. Advantageously also, protuberances may also have holes at their apex.

Preferably the material of the section is sufficiently flexible so that the section can be rolled into a cylindrical form and that the recesses and protuberances can overlap and locate within each other.

Preferably the section is made of a plastic. More preferably the plastic is chosen to be easily moulded on a former. The plastic may be a recycled plastic such as HDPE obtained from domestic waste. Advantageously a pigment may be added to the plastic to colour the plastic. Preferably the plastic is dyed black.

According to a third aspect of the present invention, there is provided a container for organic matter, the container comprising at least one section of flexible material, said inner surface being formed in part by a lattice of recesses, at least some of said recesses being of substantially truncated conical form having a wall which converges towards a hole through the section, adjacent walls forming a peak between each recess, a plurality of said peaks located on a row lengthways on the inner surface having a height greater than that of adjacent peaks across the width of the inner surface, said outer surface being formed in part by a lattice of protuberances at the same relative positional arrangement as the recesses, said section being a parallelogram arranged in a cylinder with its opposite ends overlapping and the protuberances on the outer surface of one end nesting within the recesses of the inner surface of the other end at the overlap, and a container base arranged to rest on said walls of said peaks of greater height and fastening means being provided to hold the section in said overlapping, nested engagement.

Optionally the container may further comprise a lid arranged to rest on an upper edge of the flexible section of material. With the inclusion of a lid the container becomes suitable for retaining compost.

DETAILED DESCRIPTION OF THE INVENTION

Embodiments of the present invention will now be described by way of example only with reference to the following Figures in which.

With reference to the embodiments of a plant growth container, it will be appreciated that the present invention is an improvement on the plant growth container as described in U.S. Pat. No. 5,099,607 and U.S. Pat. No. 4,939,865, accordingly these documents are incorporated herein by reference.

Figure 1:
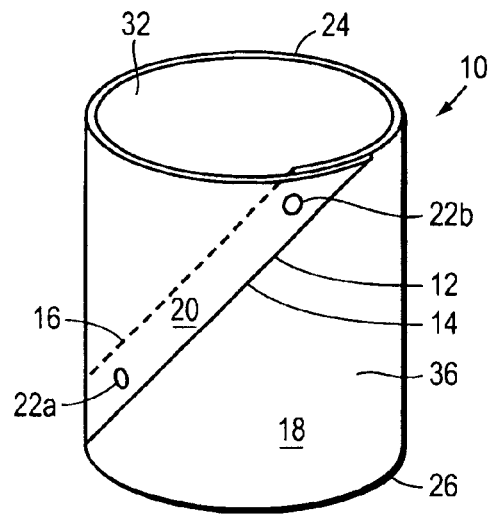
FIG. 1 is a schematic perspective view of a plant, according to a first embodiment of the present invention.

Referring initially to FIG. 1 of the drawings there is illustrated a plant container, generally indicated by reference numeral 10, in accordance with a first embodiment of the present invention. Container 10 is of substantially cylindrical shape. The container 10 includes a joint 12 where a first end 14 and a second end 16 of a section 18 making up the container 10, form an overlap 20. The ends 14, 16 are held in the overlap 20 by two screws 22a, b. The joint 12 is diagonal across the height of the cylinder from a top edge 24 to a base edge 26. The joint 12 thus forms a spiral or helix around a portion of the container 10.

Figure 2:
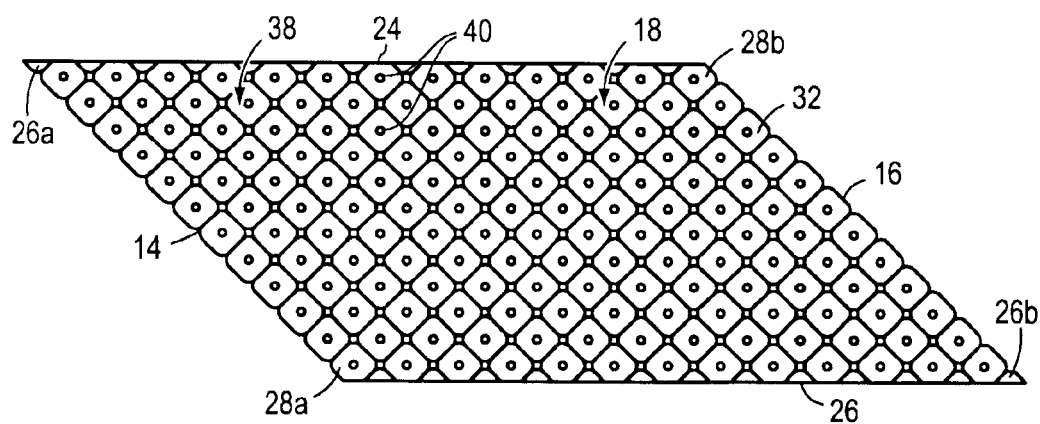
FIG. 2 is side elevation view of a section of material for making the container of FIG. 1, according to a second embodiment of the present invention.
Figure 3:
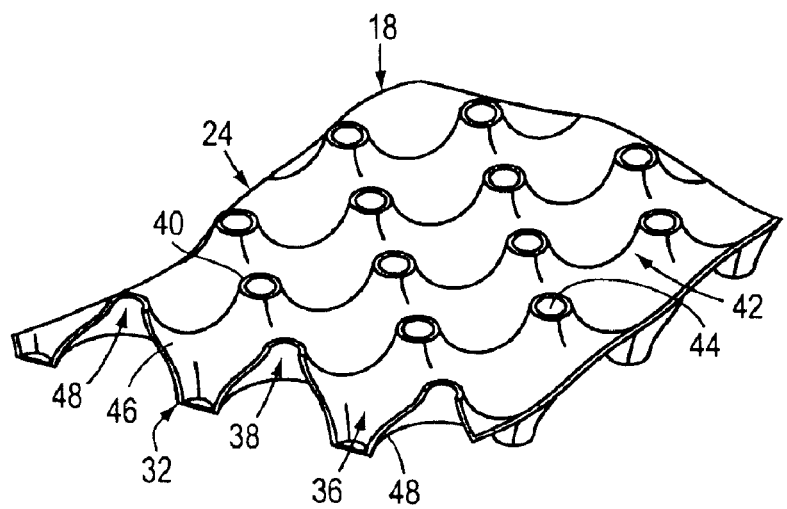
FIG. 3 is a perspective view of a portion of a section of material for making a container, according to an embodiment of the present invention.

Reference is now made to FIG. 2 of the drawings which shows section 18, before being rolled to form the cylinder of container 10. Section 18 is shaped as a parallelogram with the top and base edges, 24, 26 forming one pair of parallel sides, and the ends 14, 16 forming the second pair of parallel sides. This arrangement provides two acute angles 28a, b and two obtuse angles 30a, b. Section 18 is preferably formed from a relatively thin plastic material which is rollable and bendable into a circular cylindrical container 10. The material is sufficiently rigid and strong so that when formed into an open topped container 10, the container 10 is self supporting and is able to be filled with organic matter, such as soil, humus or the like. The material may advantageously be recycled plastic such as HDPE obtained from domestic waste making the section cheap to produce. Black pigments may be added to the plastic to produce a uniform colouring. In a preferred embodiment the plastic is biodegradable, such that the container may be planted in the ground when its contents are planted. This eases planting of the contents.

Section 18 further includes an inner surface 32 and an outer surface 36. Inner surface 32 forms the inner surface of the container 10, while outer surface 36 forms the outer surface of the container. Section 18 has been plastically distorted or contoured, preferably as it has passed through rollers having points on a forming machine. This provides a lattice of recesses 38 uniformly across the inner surface 32. Holes 40 may be formed at the ends of the recesses 38, such that, in use, roots are guided towards the holes 40 so that air pruning will occur around the outer surface 36.

The lattice structure of recesses 38 is best seen with the aid of FIG. 2, which illustrates a portion of the section 18. As can be seen from the Figure, the section has the classic structure of an egg box. The structure provides free flowing conical forms 42. Each form 42 has a point 44 which ensures there are no flat surfaces inside the container 10 which would deflect roots back into the root ball. The point 44 is typically sliced off to form a hole 40. It will be appreciated that the size of the hole can be varied by removing a greater or smaller section of the point 44. Between the recesses 38 are walls 46. The walls 46 also are substantially conical in form an taper to provide the protuberances 48 on the outer surface 38 at points where the recesses 38 appear on the inner surface 32. The walls 46 effectively form a peak 34 between the recesses 38.

Figure 4:
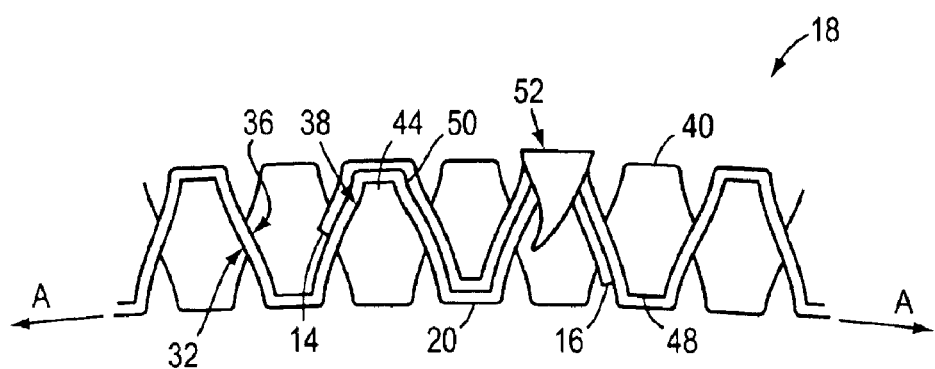
FIG. 4 is a top view of a part of a container illustrating the overlapping portion.

At the overlap 20, the first end 14 and the second end 16 are brought together so that respective recesses 38 and protuberances 48 can be engaged. This is done in the manner of stacking egg cartons. It will be appreciated that this simple interlocking arrangement of the ends 14, 16 of the section 18, can be used to stack multiple sections 18 together for ease of transportation and storage prior to containers 10 being assembled. Reference is now made to FIG. 4 of the drawings which illustrates a cross-section through a portion of the section 18 at the overlap 20. The ends 14, 16 are overlapped across two recesses 38, with the points 44 resting in the apex 50 of the protuberances 48. At one of the points 44, there is located a screw 52 which holds the two ends 14, 16 together. Though a screw 52 is illustrated an equivalent releasable fastening, such as a metal clip could be used. It will be appreciated that the number of screws 56 required to hold the overlap 20 together is less than the number of holes 40 which will occur across the overlap 20, and thus air root pruning will still be effective over this overlap 20. As illustrated in FIG. 1 two screws 52 are typically used to secure the overlap 20. In this way a lower screw will hold the container 10 in a cylindrical form while the upper screw can be removed. On removing the upper screw the end 14 at the top edge 24 can be peeled back and the contents either examined or removed, without the container 10 collapsing.

It will also be appreciated that the overlap 20 of the container comprises a greater number of recess/protuberance pairs than an equivalent container of the same height with a vertical joint. The increased number of pairs is achieved without increasing the amount of material required to construct the container 10. The increased number of pairs provides a stronger joint. In the prior art, to achieve a similar strength of joint would have required a greater overlap and thus a larger section 18 of material for the same sized container.

Figure 5:
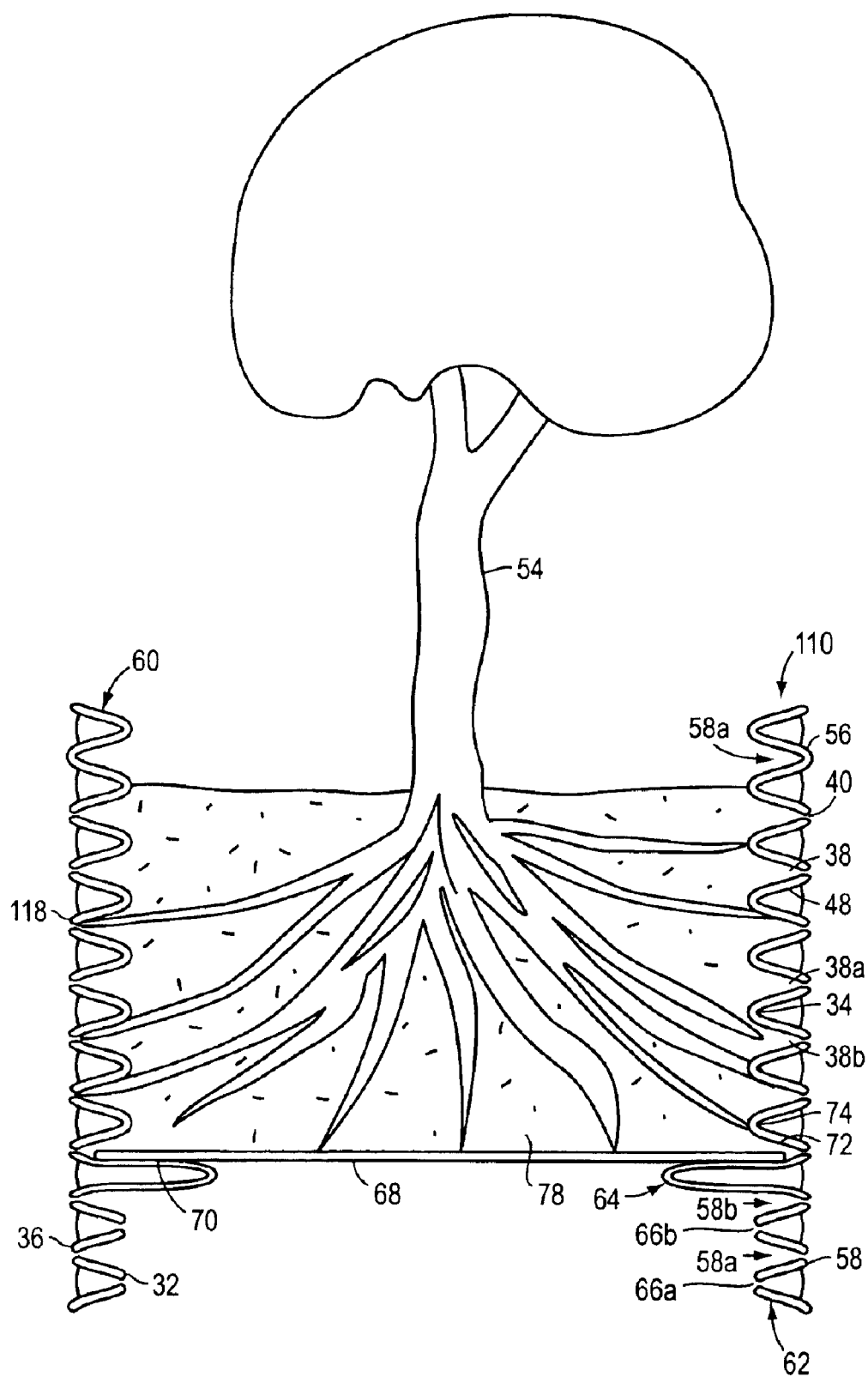
FIG. 5 is a cross-sectional view of a container, including a plant according to a third embodiment of the present invention.

Reference is now made to FIG. 5 of the drawings which illustrates an open topped container, generally indicated by reference numeral 110, in accordance with a third embodiment of the present invention. Like parts to those of FIGS. 1 to 4 have been given the same reference numeral with the addition of 100. Container 110 supports plant 54 during transportation while facilitating growth of the plant 54 within the container 110.

Container 110 compriseS an inner surface 32 and an outer surface 36. The inner surface 32 is formed as a lattice, best seen in FIG. 3, having route guiding recesses 38 which are conical in cross-section. Each recess 38 provides an equivalent protuberance 48 on the outer surface 36. Adjacent recesses 38a, b form a peak 34 on the inner surface 32 of the container 110. Each recess 38 has a base 56, through which an aperture or hole 40 may be formed. This can simply be done by slicing a portion from the outer surface.

As illustrated in FIG. 5, there are ten rows 58 of recesses 38 arranged lengthways on the lattice across the width of the container 110. At an upper end of the container 60 the first row 58a has a recess 38 which does not have a hole. At a lower end 62 of container 110, two rows 58b, c have large holes in each of the bases 56. A large hole is defined as a hole where 20% to 40% of the area of the base 56 has been removed. This can be achieved by removing a larger section of the outer surface 36 at these points. The remaining rows each have recesses 38 which include holes 40 which are of a medium size. Medium size holes are those where 6% to 20% of the area of the base 56 has been removed. The chosen percentage of area to be removed will be dependent on the species of plant in the container and how secondary root formation is achieved.

Each peak 34 of the container 110 is of similar height, excepting that of the third row from the lower end 62 of the container 110. This peak 64 has a height at least twice the amplitude of the height of the remaining peaks.

Additionally the peaks 34 associated with the lower most rows 58b, c have had their apexes sliced to form an additional hole 66a, b. A combination of holes 40 in the bases 56 of the recesses 38 and the holes 66 in the peaks 34 at the lower end 62 of the container 110 is referred to "double holing". Such double holing allows for a greater circulation of air around the lower end 62 of the container 110.

Container 110 further includes a base 68. Base 68 is a cylindrical disk inserted above the peak 64 which has the extended height. In the illustration shown in FIG. 5, the base 68 has a diameter equivalent to the diameter of the container 110. However, it will be appreciated that peaks 64 could equally support a base of narrower diameter as long as the base 68 still rested on the wall 70 of each peak 64. It will further be seen that the protuberance 72 of the peak 64 above the base 68 provides a locking mechanism to ensure that the base 68 cannot ride up towards the upper end 60 of the container 110.

As is known in the art, base 68 may include a number of apertures to allow the air pruning of roots at the base or, alternatively, base 68 may be coated prior to insertion into the container 110 with a chemical growth retardant. Additionally base 68 may include a metal grid to provide reinforcement to the base. The base may also be made of a non-galvanised steel which is biodegradable so that it can be left in the ground when the plant is 54 ready to by planted following transportation.

In use a section 118, which includes a row 58 of peaks 64 which are greater in amplitude than adjacent peaks 74, is made into a cylinder by overlapping the ends 14, 16 to interleave the recesses 38 and protuberances 48. The overlapping portion 20 is secured by screws 52 inserted via the holes 40. A base 68 can then be inserted from the upper end 60 of the container 110 to rest on the walls 70 of the heightened peaks 64. It will be appreciated that the base 68 may be inserted prior to the cylinder being formed by positioning the base 68 against the wall 70 and rolling the section 118 around the base 68. Once fastened, the improved container 110 is complete. Thereafter, growing medium 78 can be inserted above the base 68 and a plant 54 can be positioned in the growing medium 78 and allowed to grow while being capable of being transported.

Advantages of the this embodiment of the present invention are then apparent, in that the heightened peaks 64 provide additional support to the base 68, so that plants of greater weight can be carried and that containers 110 of greater diameter can be used. The holes 40 located adjacent to the growing medium 78 provides for air pruning of the roots which are guided towards the recesses 38. At the upper end 60 of the container 110, the rows 58 of recesses 38 do not have holes. This allows the plant to be watered without the water being expelled out of holes at the top of the container which would be wasteful, and thus the watering medium will be dispersed through the root growing medium 78. At the lower end 62 of the container 110 air root pruning is enhanced by the double holing of the section by providing holes both in the recesses 38 and the peaks 34.

Figure 6:
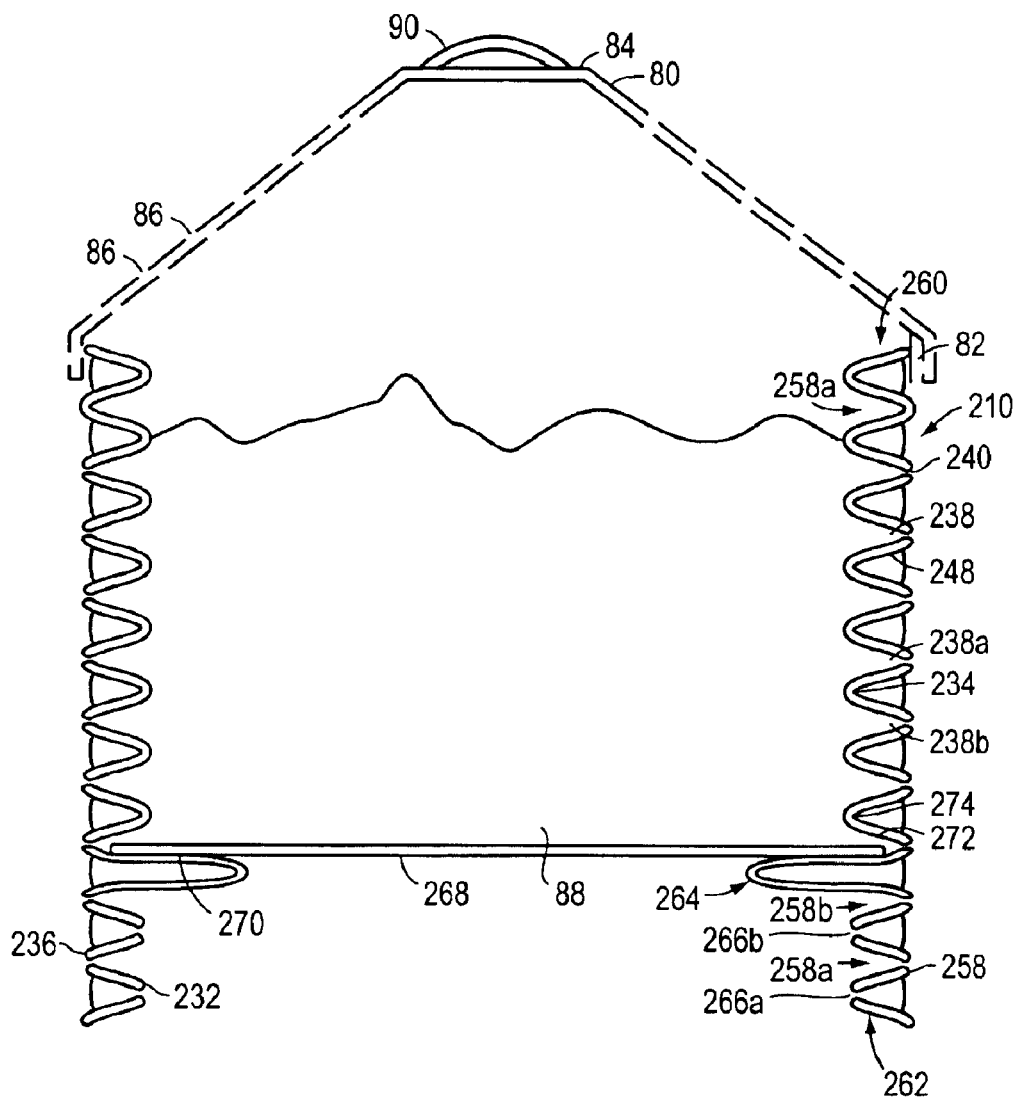
FIG. 6 is a cross-sectional view of a compost container according to a fourth embodiment of the present invention.

Reference is now made to FIG. 6 of the drawings which illustrates a compost container, generally indicated by reference numeral 210, according to a fourth embodiment of the present invention. Like parts to those in FIGS. 1 to 5 have been given the same reference numeral with the addition of 200.

Compost container 210 has a sides and a base identical to those described with reference to FIG. 5. Container 210 further includes a lid 80. Lid 80 has a substantially circular form with a lip 82 to engage with the upper end 260 of the cylindrical section of material.

Advantageously the lid 80 has a raised centre portion 84 and has a number of apertures 86 which allow for the circulation of air to the waste matter 88 decomposing within the container 210. A handle 90 is included on the lid for ease of use.

A principal advantage of the compost container is that it is easily assembled and transportable while still permitting a good circulation of air to the waste matter. Thus the container is easily portable and can be repositioned to take advantage of sunnier positions in use.

The principal advantage of the present invention is that it provides a container for organic matter and the transportation of plants which is quick to assemble, reusable, has a strong joint and on which the contents of the container can be inspected.

A further advantage of an embodiment of the present invention is that it provides a container for transporting plants which can carry substantial weights due to the strength of the joint and the support for a base.

Modifications may be made to the invention described hereinbefore, without departing from the scope thereof. For instance, in the plant root container, the recesses may have any wall shape as long as they guide the root towards a hole or aperture. Any fastening means may be used, such as the clip described in GB2350272 or, alternatively, rivets may be used in place of the screws. Preference of course would be to the use of screws so that the structure can be disassembled and re-used again. Additionally while only a single section container has been described, it will be recognised by those skilled in the art that larger diameter containers may be constructed from a number of sections by overlapping adjacent ends. These will provide a distributed strengthening around the container, while permitting more than one access point for inspection.

What is claimed is:

1. A plant container, the container comprising at least one section of flexible material, the material having an inner and an outer surface, said inner surface being formed at least in part by a lattice of recesses, at least some of said recesses converging towards a hole through the material, said outer surface being formed at least in part by a lattice of protuberances at the same relative positional arrangement as the recesses, wherein said section is formed as a parallelogram having two acute angles and two obtuse angles, the one or more sections being arranged to form a cylinder with adjacent ends overlapping and the protuberances on the outer surface of one end nesting within the recesses of the inner surface of the adjacent end at the overlap.

2. A plant container as claimed in claim 1 wherein the acute angles are in the range 30 to 60 degrees.

3. A plant container as claimed in claim 1 wherein the acute angles are at 45 degrees.

4. A plant container as claimed in claim 1 wherein the container includes one or more fastening means provided to hold the section in said overlapping, nested engagement.

5. A plant container as claimed in claim 4 wherein there are at least two fastening means arranged on the overlap.

6. A plant container as claimed in claim 4 wherein the fastening means is by screws located through the holes formed in the recesses.

7. A plant container as claimed in claim 1 wherein at least some of said recesses are of a substantially truncated conical form.

8. A plant container as claimed in claim 1 wherein each recess comprises a wall which converges towards the hole, adjacent walls forming a peak between each recess, wherein a plurality of said peaks are located on a row lengthways on the inner surface having a height greater than that of adjacent peaks across the width of the inner surface.

9. A plant container as claimed in claim 8 wherein the container further comprises a base arranged to rest on said walls of said peaks of greater height.

10. A plant container as claimed in claim 1 wherein the holes within the recesses are of various diameters over the width of the section.

11. A plant container as claimed in claim 10 wherein at least one of holes is medium sized, wherein medium sized are apertures which remove 6%–20% of the area at the base of a recess.

12. A plant container as claimed in claim 10 wherein at least one of holes is large sized, wherein large sized are apertures which remove 20%–40% of the area at the base of a recess.

13. A plant container as claimed in claim 1 wherein at least one of the protuberances includes a hole at their apex.

14. A plant container as claimed in claim 1 wherein the material is formed from a relatively thin sheet of plastic material and the said recesses in said inner surface produces said protuberances in said outer surface.

15. A plant container as claimed in claim 14 wherein the plastic is a recycled plastic.

16. A plant container as claimed in claim 15 wherein the plastic is HDPE (high density polyethylene) obtained from domestic waste.

17. A plant container as claimed in claim 1 wherein the holes within the recesses are of various diameters over the width of the section.

18. A section of material as claimed in claim 17 wherein at least one of holes is medium sized, wherein medium sized are apertures which remove 6%–20% of the area at the base of a recess.

19. A section of material as claimed in claim 17 wherein at least one of holes is large sized, wherein large sized are apertures which rem ove 20%–40% of the area at the base of a recess.

20. A section of material for forming a container, the material having an inner and an outer surface, said inner surface being formed at least in part by a lattice of recesses, at least some of said recesses converging towards a hole through the material, said outer surface being formed at least in part by a lattice of protuberances at the same relative positional arrangement as the recesses, wherein said section is formed as a parallelogram having two acute angles and two obtuse angles.

21. A section of material as claimed in claim 20 wherein the acute angles are in the range 30 to 60 degrees.

22. A section of material as claimed in claim 20 wherein the acute angles are at 45 degrees.

23. A section of material as claimed in claim 20 wherein at least some of said recesses are of a substantially truncated conical form.

24. A section of material as claimed in claim 20 wherein each recess comprises a wall which converges towards the hole, adjacent walls forming a peak between each recess, wherein a plurality of said peaks are located on a row lengthways on the inner surface having a height greater than that of adjacent peaks across the width of the inner surface.

25. A section of material as claimed in claim 20 wherein at least one of the protuberances includes a hole at its apex.

26. A section of material as claimed in claim 20 wherein the material is formed from a relatively thin sheet of plastic material and the said recesses in said inner surface produces said protuberances in said outer surface.

27. A section of material as claimed in claim 20 wherein the plastic is a recycled plastic.

28. A section of material as claimed in claim 27 wherein the plastic is HDPE (high density polyethylene) obtained from domestic waste.

29. A container for organic matter, the container comprising at least one section of flexible material, said inner surface being formed in part by a lattice of recesses, at least some of said recesses being of substantially truncated conical form having a wall which converges towards a hole through the section, adjacent walls forming a peak between each recess, a plurality of said peaks located on a row lengthways on the inner surface having a height greater than that of adjacent peaks across the width of the inner surface, said outer surface being formed in part by a lattice of protuberances at the same relative positional arrangement as the recesses, said section being a parallelogram having two acute angles and two obtuse angles arranged in a cylinder with its opposite ends overlapping and the protuberances on the outer surface of one end nesting within the recesses of the inner surface of the other end at the overlap, and a container base arranged to rest on said walls of said peaks of greater height and fastening means being provided to hold the section in said overlapping, nested engagement.

30. A container as claimed in claim 29 wherein the container further comprises a lid arranged to res on an upper edge of the flexible section of material.

\* \* \* \* \*